United States Patent [19]

Schaefer, III

[11] 4,240,135
[45] Dec. 16, 1980

[54] REGULATED CYCLOCONVERTER CIRCUIT

[75] Inventor: Edwin M. Schaefer, III, North Aurora, Ill.

[73] Assignee: Bell Telephone Laboratories, Incorporated, Murray Hill, N.J.

[21] Appl. No.: 42,804

[22] Filed: May 29, 1979

[51] Int. Cl.$^3$ .............................................. H02M 7/48
[52] U.S. Cl. ..................................... 363/43; 363/96; 363/161; 323/43.5 S
[58] Field of Search .............................. 363/160–162, 363/43, 96, 97; 323/43.5 S

[56] References Cited

U.S. PATENT DOCUMENTS

| | | | |
|---|---|---|---|
| 3,196,336 | 7/1965 | Schmidt | 363/96 |
| 3,431,483 | 3/1969 | Lafuze | 363/10 |
| 3,491,282 | 1/1970 | Heinrich et al. | 363/43 |
| 3,514,688 | 5/1970 | Martin | 363/97 |
| 3,619,765 | 11/1971 | Wood | 323/43.5 S |
| 3,652,918 | 3/1972 | Marzolf | 363/43 |
| 3,743,919 | 7/1973 | Bingley | 363/160 |
| 3,852,654 | 12/1974 | Gyugyi et al. | 363/161 |

Primary Examiner—William M. Shoop
Assistant Examiner—Peter S. Wong
Attorney, Agent, or Firm—William H. Kamstra

[57] ABSTRACT

An inverter-cycloconverter power supply providing for the selective augmentation of the battery source (17) output voltage as needed to compensate for reductions in the effective voltage output of the latter source. The output tap points (for example, 48, 50) of the coupling transformer secondary winding (43) of the cycloconverter section (30) are selected to produce a pseudo-sine wave voltage (FIG. 2, 81) composed of alternating square wave voltages of a first and a second, higher level. A regulator section (60) including a second transformer secondary winding (63) controlled by a pair of thyristors (61, 62) adds a rectified voltage to the battery source (17) voltage as required as determined by regulator control circuitry. The latter comprises monitoring circuit means (83, 84, 85, 86, 87, 92, 95) for detecting the output voltage levels of the cycloconverter and for generating control signals (FIG. 2, 86) of a duration corresponding to the effective voltage drop of the battery source (17). These control signals are employed to energize the regulator (60) thyristors (61, 62) only during the times that the cycloconverter (30) transformer taps (48, 50) are selected which produce the alternating lower voltages as timed under microcomputer (70) control.

5 Claims, 2 Drawing Figures

REGULATED CYCLOCONVERTER CIRCUIT

BACKGROUND OF THE INVENTION

This invention relates to alternating current power supplies and more particularly to such power supplies which employ a cycloconverter for transforming power from a direct current source into a pseudo-sine wave power output.

Cycloconverter power supply circuits in which positive and negative banks of switching elements are gated to convert the alternating current output of an inverter circuit at one frequency into a pseudo-sine wave output of a lower frequency are well known in the art. Such a power supply circuit is frequently employed to convert direct current power from a battery source to an alternating current output which very closely approximates a sine wave. Generally, as is known, the magnitude of the generated inverter output voltage is directly proportional to the magnitude of the battery source voltage applied thereto and any variation in the source voltage is reflected in the inverting alternating output voltage and, hence, in the ultimate cycloconverter output. Discharge of the battery, for example, with its resulting voltage reduction as well as changes in load, will also cause a change in the alternating current output power of the cycloconverter. Although in many applications of a cycloconverter power supply variations in the magnitude of the voltage output are not critical, in others, the alternating current converter output is held to tolerances less than the allowable battery source variation. Thus, for example, if the cycloconverter output is employed to drive an electric motor, variations, in the applied voltage may not only cause fluctuations in the power delivered by the motor but could also result in its damage. The cycloconverter circuit of this invention is thus chiefly directed to the problem of maintaining a substantially constant output power magnitude despite variations in the battery source voltage.

A feature of the cycloconverter power supply of the invention is directed to the equally important objective of maintaining to a minimum its cost, specifically, the cost of the inverter transistors. Normally, the cost of a transistor is directly proportional to its current conducting ability. Accordingly, to the extent that the current carrying requirements imposed on a transistor can be held to a minimum, to that extent its cost can be held down. A prior art power supply arrangement in which a voltage compensation function is performed directed to broadly similar ends is described, for example, in U.S. Pat. No. 3,491,282 of T. M. Heinrich et al., issued Jan. 20, 1970. The power supply circuit of the present invention is also a departure from the regulated cycloconverter of U.S. Pat. No. 3,743,919 of D. W. Bingley, issued July 3, 1973.

SUMMARY OF THE INVENTION

The aforementioned problems are advantageously solved and a technical advance is achieved in accordance with the principles of this invention in an inverter-cycloconverter arrangement which functions to transform direct current power from a storage battery source to an alternating current output having a waveform which closely approximates a sine wave. The inverter voltage output is sampled at its output transformer to detect any reduction in the effective battery source voltage. Regulator circuitry is provided which is energized responsive to the detection of a drop in output voltage level to add a voltage to the battery voltage as needed to compensate for the battery variance. A very nearly constant alternating current cycloconverter output power is thus achieved.

A feature of the cycloconverter voltage regulator of the invention is its control to operate only during the times in which the cycloconverter output switches select the lower output voltages during each pseudo-sine wave output cycle. At the high output taps of the output transformer secondary winding the collector current value of the inverter transistors may be of the order of four times the value of that at the low output winding taps. As a result, if the supplemental regulator voltage were added to the output voltage during the selection of the high voltage transformer taps, inverter transistors having a sufficient current carrying rating would have to be provided. The greater rating would add significantly to their cost and then for a current carrying capacity which would be required only on those limited occasions when the effective battery voltage falls. In accordance with the present invention, the regulator circuit is controlled to operate only during the selection of the low voltage taps during each cycloconverter output cycle and is inhibited at other times during the cycle. The monitor and control functions for the operation of the inverter-cycloconverter arrangement of this invention are advantageously performed by a programmed microcomputer in accordance with known computer technology.

BRIEF DESCRIPTION OF THE DRAWING

The organization and operation of a cycloconverter arrangement according to the invention together with its features will be better understood from a consideration of the detailed description of one illustrative embodiment thereof which follows when taken in conjunction with the accompanying drawings in which.

DETAILED DESCRIPTION

Figure 1:
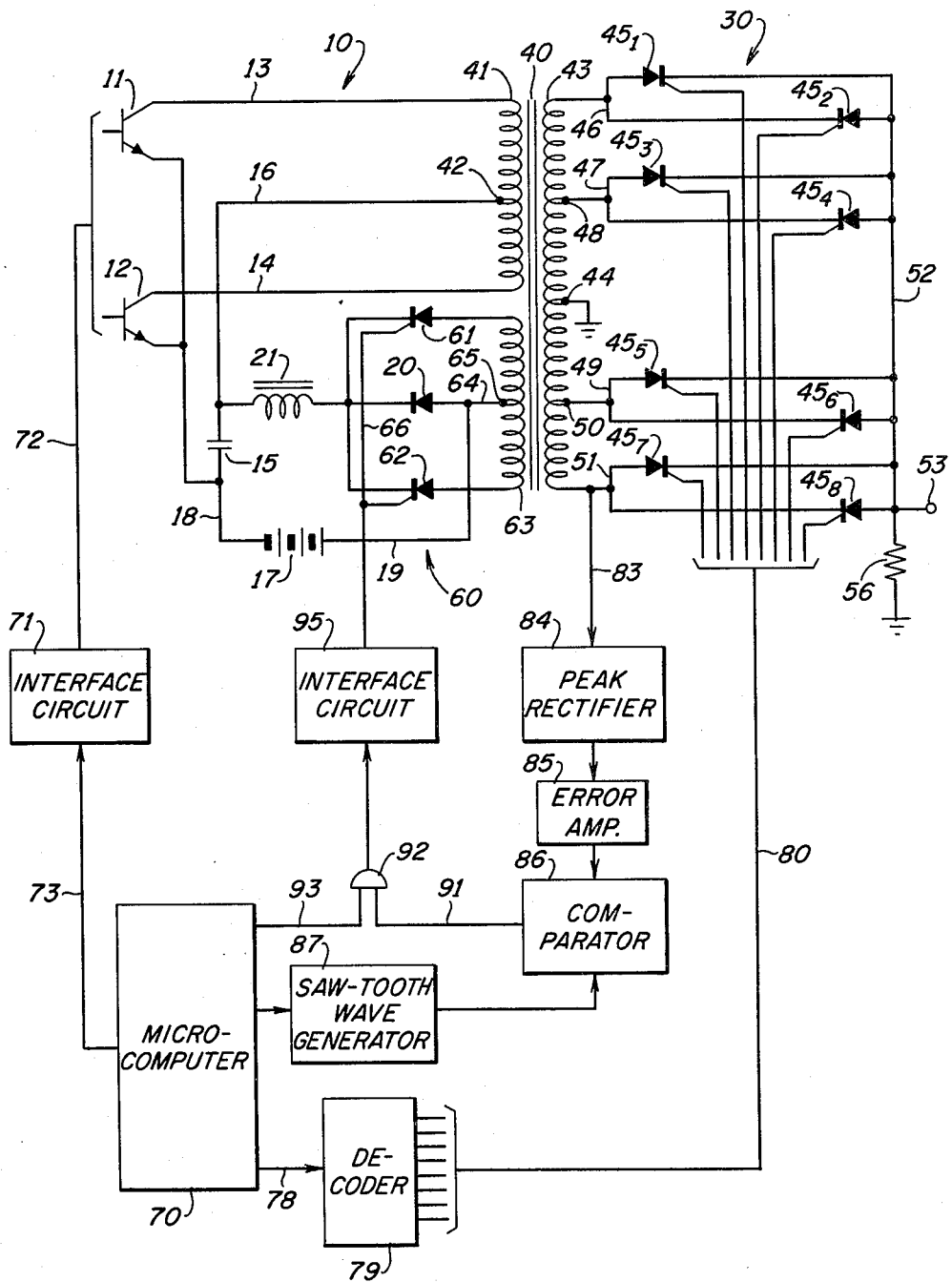
FIG. 1 shows in schematic and in block symbol form the organization of an illustrative inverter-cycloconverter circuit embodying the features of this invention.

One specific illustrative cycloconverter power supply arrangement according to this invention is depicted in FIG. 1 as comprising an inverter section 10 and a cycloconverter section 30 coupled by means of a transformer 40. Inverter section 10 conventionally comprises a pair of NPN drive transistors 11 and 12 connected in series in two branches of a circuit including corresponding halves of a primary winding 41 of transformer 40. Thus, the collectors of transistors 11 and 12 are connected, respectively, to opposite ends of winding 41 via conductors 13 and 14, their emitters being connected together and to a center-tap 42 of winding 41 via a capacitor 15 and a common conducting path comprising a conductor 16. The latter emitters are also connected to the negative terminal of a direct current source such as a battery 17 via a conductor 18. The positive terminal of battery 17 is connected to winding 41 center-tap 42 via a conducting path including a conductor 19, a diode 20, an inductance 21 (which inductance is also connected to capacitor 15 at its end opposite its emitter connection), and a conductor 16. The bases of drive transistors 11 and 12 are connected to control circuitry to be considered hereinafter.

Cycloconverter section 30 is coupled, as mentioned, to inverter section 10 by means of transformer 40, more specifically by means of a secondary winding 43 having a plurality of taps, including a grounded center-tap 44. A bank of thyristors 45 are conventionally connected in opposite polarities to particular output points of secondary winding 43 to perform the selection of output voltages making up an approximation of a sine wave. Specifically, a first pair of thyristors $45_1$ and $45_2$ is connected in opposite polarities in the branches of a first parallel circuit 46 connected at one end to one end of secondary winding 43. A second pair of thyristors $45_3$ and $45_4$ is connected in opposite polarities in the branches of a second parallel circuit 47 connected at one end to a tap 48 of winding 43 at a point substantially midway between the one end of the latter winding and its center-tap 44. Similarly, a third pair of thyristors $45_5$ and $45_6$ is connected in opposite polarities in the branches of a third parallel circuit 49 connected at one end to a tap 50 of winding 43 at a point substantially midway between the other end of the latter winding and its center-tap 44. Finally, in this embodiment of the invention, a fourth pair of thyristors $45_7$ and $45_8$ is connected in opposite polarities in the branches of a fourth parallel circuit 51 connected at one end to the opposite end of secondary winding 43. The other ends of parallel circuits 46, 47, 49, and 51 are connected to a common output conductor 52, which conductor terminates in an output terminal 53 and a load resistor 56. The gate electrodes of each of the thyristors 45 are connected to control circuitry to be considered hereinafter.

One feature of a power supply circuit according to this invention is a voltage regulator section 60 coupled to both inverter section 10 and cycloconverter section 30 by means of transformer 40. More specifically, regulator section 60 comprises a pair of thyristors 61 and 62 connected in series in two branches of a circuit including corresponding halves of an additional secondary winding 63 of transformer 40. The anodes of thyristors 61 and 62 are connected to respective opposite ends of winding 63 and the cathodes of the latter thyristors are connected together and to the junction of inductance 21 and diode 20. The two branches of the regulator circuit share a common conducting path including the latter diode and a conductor 64 connected to a center-tap 65 of winding 63. The gate electrodes of thyristors 61 and 62 are connected to a common control conductor 66 extending to control circuitry which may now be considered.

Circuitry for performing the control functions for the operation of a power supply according to this invention are readily devisable once its novel features are understood and a number of specific control arrangements will be envisioned by one skilled in the art. In practice it was found that the power supply of the invention is advantageously adapted for operation under microcomputer control for which a number of computers are commercially available. An INTEL 8748 microcomputer, for example, programmed to provide the limited number of timing and logic signals required for circuit operation, may advantageously be employed in conjunction with the circuit so far described to accomplish the control function. The operation of the aforementioned microcomputer is well known and is described in detail, for example, in MCS48™ *Microcomputer User's Manual*, (1976) published by INTEL Corporation, 3065 Bowers Avenue, Santa Clara, California 95051.

Figure 2:
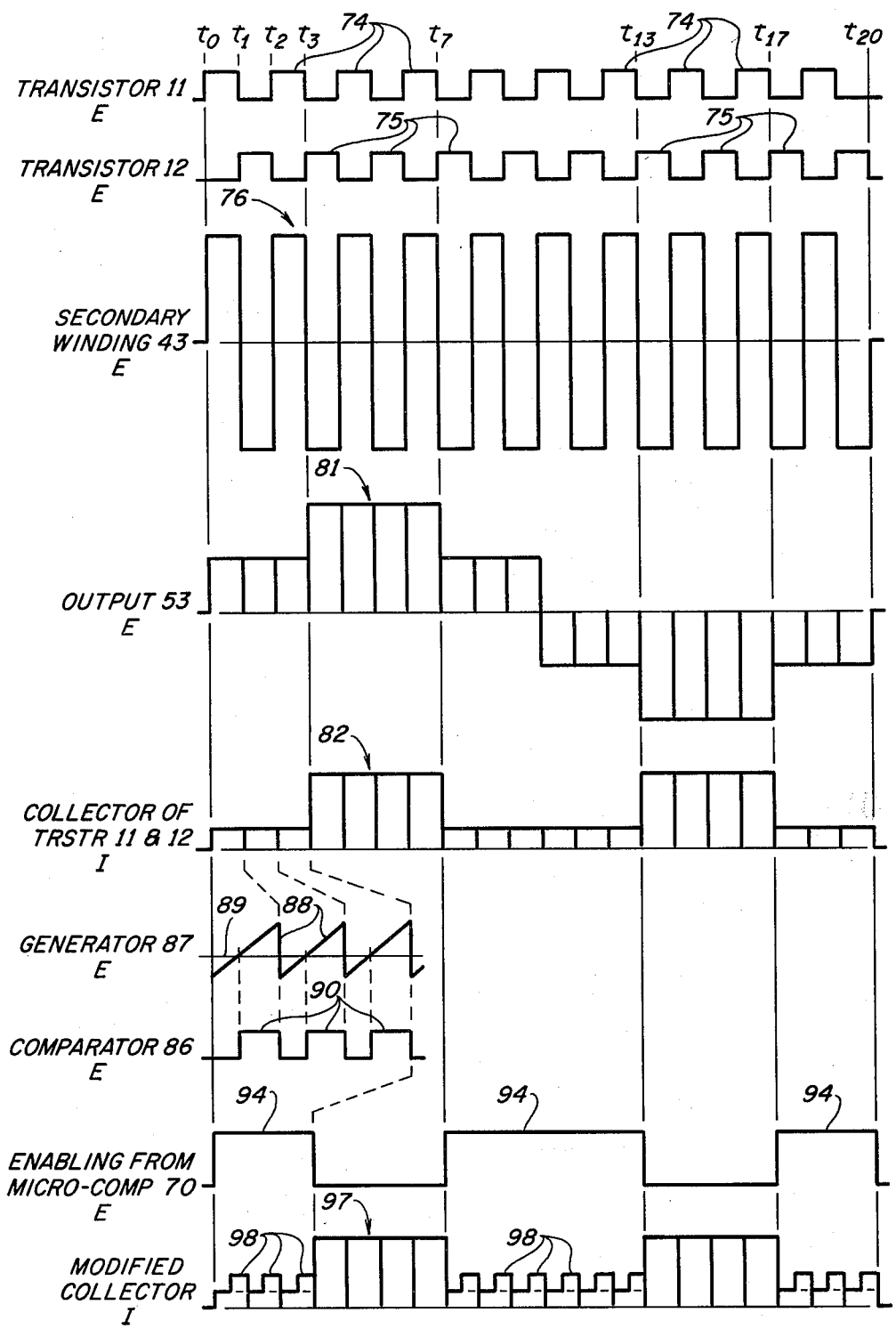
FIG. 2 is a chart depicting various idealized voltage and current waveforms appearing at particular points in the cycloconverter circuit diagram of FIG. 1 during exemplary sequences of operation.

The organization of the control circuitry of the power supply of FIG. 1 may best be understood from a description of illustrative operations thereof with particular reference to the waveform chart of FIG. 2. In a first illustrative operation it will be assumed that the effective voltage supplied by battery 17 is constant and of a magnitude to ensure the power output required by a utilization circuit connected to output terminal 53. Inverter section 10 is operated under the control of microcomputer 70 which initiates the application of periodic positive voltage pulses alternately to the bases of transistors 11 and 12. The periodic pulses are represented in FIG. 2 by the idealized square waveforms 74 and 75 alternately occurring at times $t_0$, $t_1$, $t_2$, etc., and are provided by an interface circuit 71 via a cable 72. Interface circuit 72 is operated responsive to timed control signals applied thereto from microcomputer 70 via a cable 73 and ensures that the enabling pulses 74 and 75 are of suitable amplitude and wave shape to render transistors 11 and 12 conductive. Although pulses 74 are shown as terminating at the times at which pulses 75 are initiated and vice versa, in practice the pulses may be timed so that one terminates before the other is initiated to ensure that transistors 11 and 12 are not concurrently conductive. Conventionally, the alternating conduction of transistors 11 and 12 generates equal but opposite square wave alternating voltages in the halves of transformer 40 secondary winding 43 as represented in FIG. 2 by waveform 76 appearing on the upper half of winding 43.

Timed to correspond with the enabling of inverter transistors 11 and 12, a three bit binary code is supplied by microcomputer 70 via a cable 78 to a decoder circuit 79 which in turn generates a sequence of enabling pulses, not shown, via a cable 80 to control the selective enabling of thyristors 45 of the cycloconverter section 30. Center-taps 44, 48, and 50 of secondary winding 43 are arranged in this embodiment so that the voltages appearing across each half of winding are twice the magnitude of the voltages appearing across the winding sections between center-tap 44 and taps 47 and 50. In accordance with well-known cycloconverter operation, a suitable selection of the voltages appearing across the four sections of winding 43 as induced by inverter section 10 will result in an approximation of a sine wave voltage output as represented by waveform 81 in FIG. 2. Bearing in mind the phase relationship of the alternating voltages appearing across the two halves of winding 43 (voltage waveform 76 represents the voltage on the upper half of the winding in response to inverter 10 action), and the poling of thyristors 45 in parallel circuits 46, 47, 49, and 51, then the following sequence of thyristor energization will achieve the desired output waveform for a single output cycle: $45_3$, $45_5$, $45_3$, $45_7$, $45_1$, $45_7$, $45_1$, $45_5$, $45_3$, $45_5$, $45_6$, $45_4$, $45_6$, $45_2$, $45_8$, $45_2$, $45_8$, $45_4$, $45_6$, and $45_4$. As is apparent from the chart of FIG. 2, thyristors 45 are energized only for the periods as determined by the times $t_0$, $t_1$, $t_2$, etc. An alternating composite voltage output is thus applied to output terminal 53 which in this case is one-tenth the frequency of inverter section 10 output. For loads connected to output terminal 53 that are nearly resistive, the collector currents of inverter transistors 11 and 12, when the entire halves of winding 43 are selected by thyristors 45, are substantially four times the current magnitudes as those currents when the intermediate taps 48 and 50 are selected. These currents are represented by waveform 82 in FIG. 2 as the currents appearing during a normal operation of the power supply of FIG. 1.

The voltages appearing across secondary winding 43 of cycloconverter section 30 are monitored via a conductor 83 connected to one end of secondary winding 43 by means of a peak rectifier circuit 84 and an error amplifier 85. Rectifier 84 is adapted to provide an average output voltage proportional to the peak voltage applied thereto from winding 43. This output voltage is applied to amplifier 85 in which it is compared with a fixed reference voltage, the difference between the two voltages determining the magnitude of a proportional voltage representative of any deviation from the normal effective voltage level of battery 17. The error voltage is applied to a comparator circuit 86 to which sawtooth voltage waves are also applied, the latter waves being generated by a sawtooth wave generator 87 under the control of microcomputer 70 at times $t_0$, $t_1$, $t_2$, etc. The output voltages of generator 87 are represented in an expanded one and one-half cycles of inverter 10 output as the waveforms 88 in FIG. 2. In a normal operation, that is, one in which there has been no reduction in the normal effective voltage level of battery 17, the output of error amplifier 85 remains above the peak level of sawtooth wave 88 also applied to comparator circuit 86. As a result, comparator circuit 86 produces no output voltage and the regulator section 60 of the power supply of FIG. 1 remains inactive. In this case, the current path from the positive terminal of battery 17 may be traced via conductor 19, diode 20, inductance 21, and conductor 16 to center-tap 42 of primary winding 41 of inverter section 10. Thyristors 61 and 62 of regulator section 60 remain inactive at this time.

In accordance with one feature of a cycloconverter power supply of this invention, regulator section 60 becomes operative when the effective voltage output of battery 17 falls below its normal level as detected by the monitoring of the outputs on secondary winding 43 as mentioned in the foregoing. The extent of the reduction in battery 17 voltage level is represented by the level of the voltage output of error amplifier 85 which is applied to comparator circuit 86. That is, the voltage output level of amplifier 85 falls with the battery 17 voltage level. An exemplary error voltage level is represented by level 89 superimposed on the sawtooth waveform 88 in FIG. 2. As a result of voltages 88 and 89 being applied to comparator circuit 86, a positive output pulse is generated by the latter circuit at a time when the voltage levels are equal in accordance with a typical operation of well-known comparator circuit means. Thus, as exemplified by the idealized waveforms 90 in the expanded time scale portion of the chart of FIG. 2, an output pulse is initiated by comparator circuit 86 each time voltage levels 88 and 89 coincide and is terminated at the termination of each sawtooth waveform 88. Pulses 90 are applied via a conductor 91 to one input of an AND gate 92. AND gate 92 is enabled by enabling signals supplied by microcomputer 70 via a conductor 93 at times to be hereinafter considered. The enabling voltages applied to AND gate 92 are represented in FIG. 2 by the idealized positive waveforms 94 the scale of which is again that of times $t_0$, $t_1$, $t_2$, etc. As AND gate 92 is enabled, its pulsed voltage outputs are applied to the input of a second interface circuit 95 where the pulsed outputs are shaped to suitably turn on thyristors 61 and 62 of regulator section 60. The outputs of interface circuit 95 are simultaneously applied to the gate electrodes of thyristors 61 and 62 via conductor 66. Only one of the latter thyristors is conductive at any time period $t_0$, $t_1$, $t_2$, etc., since one or the other will be back-biased by the polarity of the voltages induced across the two halves of center-tapped secondary winding 63 by the voltages appearing across primary winding 41. As a result of the alternating conduction of thyristors 61 and 62 (which comprise a controlled rectifier), the average value rectified voltages generated across secondary winding 63 will be added to the battery 17 voltages at the junction of filter inductance 21 and capacitor 15 for time periods as determined by the lengths of pulses 90 generated by comparator circuit 86. As a result, the collector current of transistors 11 and 12 is modified as represented by waveform 97 in FIG. 2 where for the first three time periods between times $t_0$ and $t_3$, for example, additional currents are drawn as represented by subsidiary square waves 98. As a result of the periodic additional voltages added to the effective battery voltage as described, the average voltage applied by primary winding 41 remains substantially unchanged despite reductions in effective battery 17 voltage.

In accordance with another feature of a power supply of this invention, the added voltages from secondary winding 63 are applied to inverter section 10 only when the secondary winding 43 taps 48 and 50 are selected by cycloconverter thyristors 45. As mentioned hereinbefore and as indicated in the chart of FIG. 2, the collector current of inverter transistors 11 and 12 when these taps are selected is substantially one-fourth that of the collector current when the full winding 43 halves are selected. Accordingly, in order to obviate the necessity of increasing the peak collector current capability of inverter transistors 11 and 12, the regulator section 60 is advantageously adapted to load the latter transistors only when the cycloconverter section applies a minimum load. This is accomplished by timing enabling signals 94 applied to AND gate 92 from microcomputer 70 to occur only when thyristors $45_3$, $45_4$, $45_5$, and $45_6$ are turned on, that is, only when the low voltage taps of secondary winding 43 are selected.

In the foregoing, the organization of the control section of the power supply of the invention was described in terms of the functions and outputs generated by the various circuits involved, these being shown in block symbol form. Since the details of the control section circuits will be readily envisioned and devisable by one skilled in the art when the desired outputs are known, they need not here be described in greater detail for a complete understanding of the invention.

What has been described is considered to be only one specific illustrative cycloconverter power supply according to the principles of this invention. Accordingly, it is to be understood that various and numerous other arrangements may be devised by one skilled in the art without departing from the spirit and scope of the invention as limited only as defined in the accompanying claims.

What is claimed is:

1. A power supply circuit comprising an inverter circuit means comprising a pair of circuit loops each including one-half of a primary winding of a transformer, a first common conducting path connected at one end to a center-tap of said primary winding, said first common conducting path including a direct current battery source, and first switching means for alternately connecting the other end of said first common conducting path in each of said loops; cycloconverter circuit means comprising a bank of second switching means connected to predetermined taps of a first secondary winding of said transformer, and first control means for selectively energizing said second switching means for selecting voltages of a first and a second, higher magnitude appearing on said first secondary winding; regulator circuit means comprising voltage monitoring circuit means associated with said first secondary winding for generating output signals indicative of voltage magnitudes appearing on said first secondary winding, a pair of circuit loops each including one-half of a second secondary winding of said transformer, a second common conducting path including a segment of said first common conducting path connected at one end to a center-tap of said second secondary winding, and third switching means for connecting said halves of said second secondary winding to the other end of said segment of said first common conducting path; comparator circuit means operated responsive to said output signals for generating error signals of a duration representative to said voltage magnitudes appearing on said first secondary winding, second control means for controlling said third switching means operated responsive to said error signals for adding voltages on said halves of said second secondary winding to voltage outputs of said battery source, and means for energizing said second control means only when said voltages of said first magnitude are selected by said cycloconverter circuit means.

2. A power supply circuit comprising inverter circuit means for converting a constant voltage from a battery source applied to an input circuit of said inverter circuit means to a first alternating square wave voltage, cycloconverter circuit means coupled to said inverter circuit means by a transformer for converting said first alternating square wave voltage to second alternating voltages of a first and a second, higher magnitude, and regulator circuit means comprising circuit means for monitoring said second alternating voltages and for generating input signals of durations representative of the magnitudes of said second alternating voltages, a secondary winding on said transformer having a center-tap, a pair of circuit loops each including one-half of said secondary winding, a common conducting path connected at one end to said center-tap and at the other end to said input circuit, and a pair of switching elements connected respectively in said pair of circuit loops; control circuit means operated responsive to said output signals for controlling the operation of said switching elements, and means for inhibiting the operation of said control circuit means when said cycloconverter circuit means converts said first alternating square wave voltages to said second alternating voltages of said second, higher magnitudes.

3. A power supply circuit comprising inverter circuit means having an input circuit including a direct current source for converting a constant voltage from said source to a first alternating square wave voltage, cycloconverter circuit means coupled to said inverter circuit means by a transformer and comprising a bank of first switching elements connected to predetermined taps of a first secondary winding of said transformer, said first switching elements being selectively energizable in a predetermined sequence to select voltages of a first and a second, higher magnitude appearing on said first secondary winding, regulator circuit means comprising a second secondary winding on said transformer having a center-tap, a pair of circuit loops each including one-half of said second secondary winding and a second switching element, and a common conducting path connected in said input circuit of said inverter circuit means and to said center-tap; and control circuit means comprising monitoring circuit means for monitoring voltages appearing on said first secondary winding and for generating output signals indicative of the magnitudes of said last-mentioned voltages, first circuit means energized responsive to said output signals for generating error signals of durations indicative of said magnitudes of voltages appearing on said first secondary winding, second circuit means for energizing said second switching elements responsive to said error signals, and gating means for controlling said circuit means for energizing said second switching elements only when said first switching elements are energized to select voltages of said first magnitude.

4. A power supply circuit as claimed in claim 3 in which said first circuit means comprises a rectifying circuit means operated responsive to said output signals for generating a voltage level corresponding to the magnitude of voltages appearing on said first secondary winding, a sawtooth wave generator for generating period sawtooth voltage waveforms, and a comparator circuit means for comparing said voltage level and said sawtooth voltage for initiating said error signals when said voltage level and said sawtooth voltage coincide in amplitude.

5. A power supply circuit as claimed in claim 4 in which said gating means comprises an AND gate operated responsive to said error signals and enabling signals coordinated with the predetermined sequence of energization of said first switching elements.

* * * * *

UNITED STATES PATENT AND TRADEMARK OFFICE
CERTIFICATE OF CORRECTION

PATENT NO. : 4,240,135
DATED : December 16, 1980
INVENTOR(S) : Edwin M. Schaefer, III It is certified that error appears in the above-identified patent and that said Letters Patent are hereby corrected as shown below:

In the claims, Column 7, claim 2, line 42, delete "input" and insert --output--.

Signed and Sealed this

Second Day of November 1982

[SEAL]

Attest:

Attesting Officer

GERALD J. MOSSINGHOFF

Commissioner of Patents and Trademarks